(12) United States Patent  (10) Patent No.: US 9,158,926 B2
Wentz et al.  (45) Date of Patent: Oct. 13, 2015

(54) ENGINE CONTROL UNIT CONFIGURATION SECURITY

(71) Applicant: General Electric Company, Schenectady, NY (US)

(72) Inventors: Jared J. Wentz, Wauwatosa, WI (US); Lori J. Welch, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 13 days.

(21) Appl. No.: 14/153,811

(22) Filed: Jan. 13, 2014

(65) Prior Publication Data

US 2015/0199522 A1  Jul. 16, 2015

(51) Int. Cl.
*G06F 21/60* (2013.01)
*G06F 21/73* (2013.01)

(52) U.S. Cl.
CPC .............. *G06F 21/60* (2013.01); *G06F 21/73* (2013.01)

(58) Field of Classification Search
CPC ...... H04L 63/0428; G06F 21/60; G06F 21/73
USPC .......................................................... 726/26
See application file for complete search history.

(56) References Cited

U.S. PATENT DOCUMENTS

| | | | |
|---|---|---|---|
| 4,244,023 A * | 1/1981 | Johnson | 701/110 |
| 4,266,522 A * | 5/1981 | Williams et al. | 123/492 |
| 5,606,315 A | 2/1997 | Gaskins | |
| 5,731,688 A | 3/1998 | Thomson | |
| 5,734,255 A | 3/1998 | Thompson et al. | |
| 5,754,033 A | 5/1998 | Thomson | |
| 5,787,367 A | 7/1998 | Berra | |
| 6,285,948 B1 | 9/2001 | Takagi et al. | |
| 6,505,105 B2 | 1/2003 | Allen et al. | |
| 6,550,052 B1 | 4/2003 | Joyce et al. | |
| 6,571,191 B1 | 5/2003 | York et al. | |
| 6,604,027 B1 | 8/2003 | Kawakami et al. | |
| 6,795,754 B2 | 9/2004 | Sunami et al. | |
| 6,907,495 B2 | 6/2005 | Matsuura et al. | |
| 6,957,136 B2 | 10/2005 | Tachibana et al. | |
| 6,957,296 B2 | 10/2005 | Terada et al. | |
| 6,999,869 B1 | 2/2006 | Gitlin et al. | |
| 7,068,147 B2 | 6/2006 | Suganuma et al. | |
| 7,132,923 B2 | 11/2006 | Yashiki et al. | |
| 7,213,097 B2 | 5/2007 | Kasame et al. | |
| 2004/0002793 A1 | 1/2004 | Tachibana et al. | |
| 2004/0024502 A1 * | 2/2004 | Squires et al. | 701/33 |

* cited by examiner

*Primary Examiner* — Kambiz Zand
*Assistant Examiner* — Benjamin Kaplan
(74) *Attorney, Agent, or Firm* — Ernest G. Cusick; Frank A. Landgraff

(57) ABSTRACT

An engine control unit configuration security system receives a request with a serial number associated with an engine control unit and a requested engine control unit change. The system determines that the requested engine control unit change is approved and in response generates a code including a serial number associated with the engine control unit and an instruction that causes the engine control unit to implement the requested engine control unit change.

20 Claims, 5 Drawing Sheets

ENGINE CONTROL UNIT CONFIGURATION SECURITY

TECHNICAL FIELD

The present disclosure relates to engine control units that control engines generally and in particular to methods and systems for protecting the configuration of engine control units.

BACKGROUND

Modern engines of all types are complex machines that require precise calibrations of many parameters to operate at optimal performance and efficiency. Therefore, many manufacturers of engines set such calibrations at manufacture and associate "types" with the calibrations and with the engine control unit that controls the engine. These types can then be used to ensure that only calibrations that have the same type as the engine control unit or a type compatible with the engine control unit may be implemented on the unit. Manufacturers of engines may not allow end users to adjust calibrations at all, instead requiring that any changes be performed or approved in advance by the manufacturer to ensure the engine remains properly calibrated and within operating specifications.

BRIEF DESCRIPTION OF THE INVENTION

In an exemplary non-limiting embodiment, system may include a memory with instructions and a processor coupled to the memory that, when executing the instructions, receives a serial number associated with an engine control unit and a requested engine control unit change. The system may determine that the requested engine control unit change is approved and generate a code that includes the serial number associated with the engine control unit and an instruction that causes the engine control unit to implement the requested engine control unit change.

In another exemplary non-limiting embodiment, a method is disclosed for receiving, at a calibration change device, a serial number associated with an engine control unit and a requested engine control unit change. The method further determines that the requested engine control unit change is approved and generates a code comprising the serial number associated with the engine control unit and an instruction that causes the engine control unit to implement the requested engine control unit change.

In another exemplary non-limiting embodiment, a computer-readable medium may have computer-executable instructions, which when executed by a processor, cause the processor to perform operations such as receiving a serial number associated with an engine control unit and a requested engine control unit change. The operations may further include determining that the requested engine control unit change is approved and generating a code comprising the serial number associated with the engine control unit and an instruction that causes the engine control unit to implement the requested engine control unit change.

The foregoing summary, as well as the following detailed description, is better understood when read in conjunction with the drawings. For the purpose of illustrating the claimed subject matter, there is shown in the drawings examples that illustrate various embodiments; however, the invention is not limited to the specific systems and methods disclosed.

BRIEF DESCRIPTION OF THE DRAWINGS

These and other features, aspects, and advantages of the present subject matter will become better understood when the following detailed description is read with reference to the accompanying drawings, wherein.

DETAILED DESCRIPTION OF THE INVENTION

Figure 1:
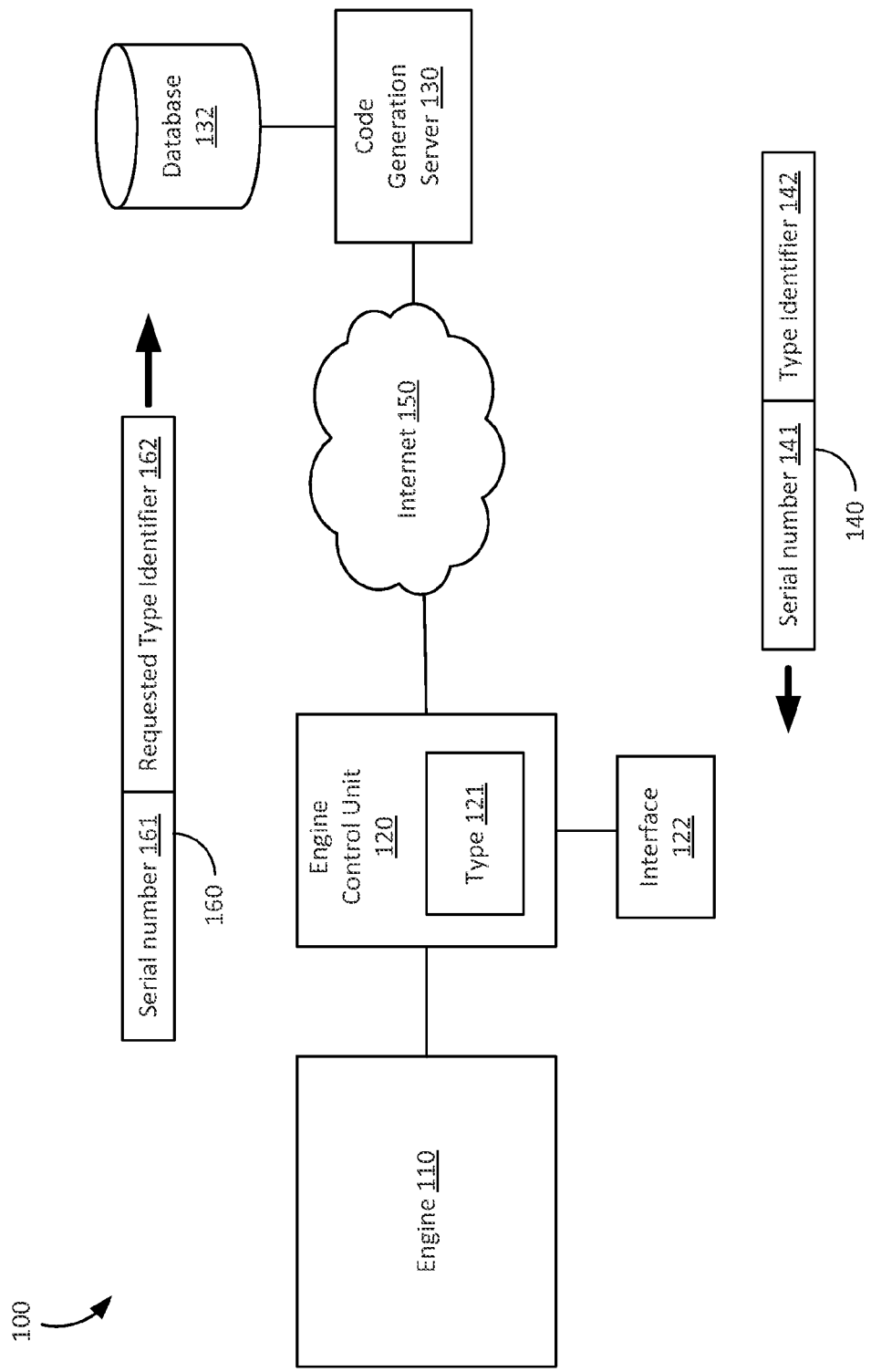
FIG. 1 is a block diagram of a non-limiting exemplary engine control unit configuration security system.

FIG. 1 illustrates exemplary system 100 that may be implemented according to an embodiment. System 100 as illustrated is a simplified block diagram that will be used to explain concepts disclosed herein, and therefore is not to be construed as setting forth any physical requirements or particular configuration required for any embodiment disclosed herein. All components, devices, systems, and methods described herein may be implemented with number of components of any shape, form, or type, and any combination of any such components that are capable of implementing the disclosed embodiments are contemplated as within the scope of the present disclosure.

Engine 110 may be any type of engine, including any type of internal combustion engine, such as a gas turbine engine, a diesel engine, and a gasoline engine. Engine control unit 120 maybe any type of computing device or controller, and may control engine 110 and any components of engine 110, and may control and/or set parameters that affect the operation of engine 110. Modern engines may have many different parameters and calibrations that may be adjusted or set. Among these are maximum horsepower allowed, maximum torque allowed, maximum revolutions per minute (RPMs) allowed, maximum overload, timing maps, governor adjustments, maximum boost allowed for turbocharged engines, limits for engine, engine component, and engine fluid temperatures, detonation limits, number of cylinders to use under specified conditions, etc. All such parameters and calibrations, and any others that may be configured for an engine, are contemplated as within the scope of the present disclosure. All such parameters and calibrations may be initially set at the time of manufacture or before an engine using such an engine control unit is provided to a customer to ensure that they are correct.

A "type" may be configured at engine control unit 120 and may be associated with each calibration and parameter configured on the engine to ensure that the engine does not become configured with incompatible calibrations or parameters. For example, the type may be for an engine with a particular mechanical configuration (e.g., six cylinder diesel engine generating 500 horsepower). By checking that any calibrations or parameters are associated with the same type, the engine control unit can ensure that no changes are made that are incompatible with the engine (e.g., calibration for 12 cylinder engine or gasoline engine) or are not authorized (e.g., increase horsepower to 600 without paying extra required fee). The engine control unit may be configured so that it is not possible for the customer to alter such parameters and calibrations unless the types associated with the new parameters and calibrations match the type of the engine configured in the engine control unit. To change the type configured in an engine control unit may require assistance from the seller or manufacturer of the engine and/or the engine control unit. Note that engine control unit 120 may be initially configured with many or even all possible parameters and calibrations, but may only present those to an operator for manipulation that are associated with the type specified in the engine control unit. Upon changing the type, the operator may then be permitted to adjust parameters and calibrations that are associated with the new type.

Engine control unit 120 may be configured with type 121 that serves as an indicator of the type assigned to this engine and that can be used to verify that parameter and calibration changes have the same type. Engine control unit 120 may also be configured with a serial number. Engine control unit may also be configured with interface 122 that allows interaction with engine control unit 120. Interface 122 may include any one or more of a keyboard, monitor, mouse, disk drive, network connection to any one or more networks (including the Internet, another data network, and a voice network), etc.

Upon determining that a type change is needed, an operator of engine 110 may send request 160 requesting a type change code to adjust the type configured at engine control unit 120. Request 160 may take any form, including a telephone call where the operator requests a type change code from the seller or manufacturer of engine 110. In response, the seller or manufacturer may generate and provide such a code as described herein. Alternatively, the operator of engine 110 may use an automated interface, such as a web page, to generate request 160 and, in some embodiments, receive an automatically generated type change code generated as described herein. In yet other embodiments, the operator may email or send some other form of electronic request 160 for such a code to the manufacturer or seller of engine 110 via Internet 150 and receive a response in the same manner including the requested type change code that may be generated manually or automatically. All such embodiments are contemplated as within the scope of the present disclosure.

In an embodiment, request 160 from the operator may include an identifier 162 of the specific type change desired, as well as serial number 161 of engine control unit 120. Alternatively, rather than the serial number of engine control unit 120, the request may include one or more identifiers that may be used by the manufacturer or seller of engine 110 to determine a serial number for engine control unit 120. This request may then be provided to the manufacturer or sell of engine 110. Note that the request may also be encrypted so that only the intended recipient may decrypt the request.

Upon receipt of the request, the manufacturer or seller of engine 110 may verify the request, decrypt request 160 if necessary, and generate type change code 140. In some embodiment, this process may be automated. The process of verification may include determining that the requested type is in fact compatible with engine 110 and/or determining that the operator of engine 110 is entitled (e.g., has paid for) the change to the requested type. In an embodiment, code generation server 130 may be used to generate such a code. Code generation server 130 may be any type of computing device or any combination of any number and types of computing devices. Code generation server 130 may be configured with or otherwise have access to database 132 that may be a database configured with serial numbers, currently configured types, and any other data associated with engines and engine control units. Such data may be used to verify that request 160 is valid and from a legitimate source.

Generated type change code 140 may include serial number 141 of engine control unit 120 and type identifier 142. Other data may be included in type change code 140, and type change code 140 may be encrypted, scrambled, or otherwise altered to only be readable to engine control unit 120. Type change code 140 may also be referred to as a "key" and used in a manner to "unlock" configurations (parameters and calibrations) in place in engine control unit 120 but otherwise not available due to having a type that does not correspond to type 121. Type change code 140 may be provided in any manner, including electronically via internet 150, verbally, on a disk of any type, or using any other means, all of which are contemplated as within the scope of the present disclosure.

Upon receipt of type change code 140, the operator of engine 110 may provide type change code 140 to engine control unit 120, in an embodiment using interface 122. Engine control unit 120 may be configured with software that (after decryption if necessary) checks type change code 140 to ensure that serial number 141 matches the serial number configured on engine control unit 120. The type change may be performed immediately by engine control unit 120 upon receiving type change code 140, in response to interaction with the operator after receiving type change code 140, or at a time in the future set at engine control unit 120 by the operator or specified in type change code 140. All such embodiments are contemplated as within the scope of the present disclosure.

Once type 121 is changed in engine control unit 120 in response to receiving type change code 140, the operator may be permitted to select configurations, parameters, and calibrations associated with that type at engine control unit 120.

Figure 2:
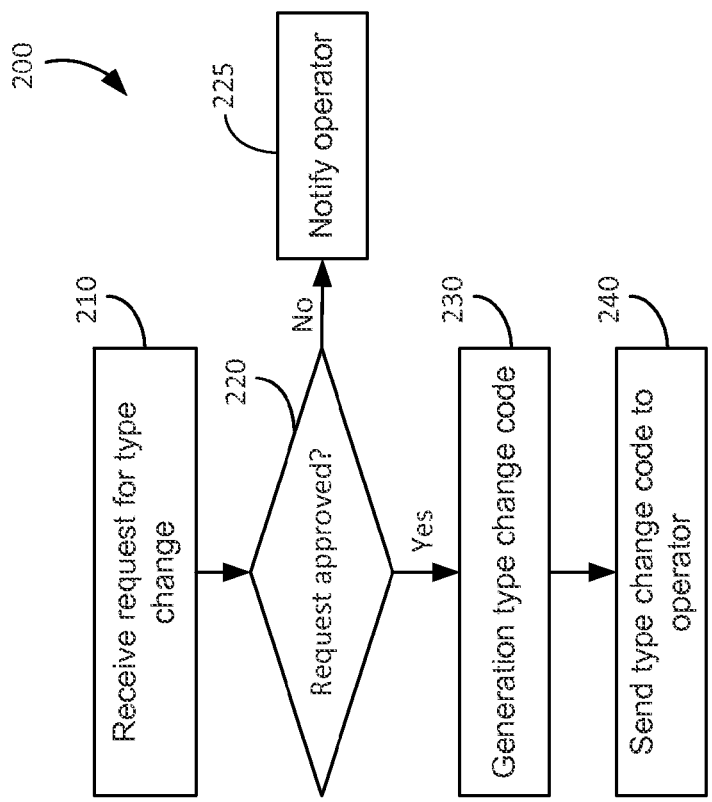
FIG. 2 is a flowchart illustrating a method of implementing a non-limiting exemplary engine control unit configuration security system.

FIG. 2 illustrates exemplary, non-limiting method 200 of implementing an embodiment as disclosed herein. Method 200, and the individual actions and functions described in method 200, may be performed by any one or more devices or components, including those described herein, such as code generation server 130 of FIG. 1, and/or any other component or device of the systems illustrated in FIG. 1. In an embodiment, method 200 may be performed by any other devices, components, or combinations thereof, in some embodiments in conjunction with other systems, devices and/or components. Note that any of the functions and/or actions described in regard to any of the blocks of method 200 may be performed in any order, in isolation, with a subset of other functions and/or actions described in regard to any of the other blocks of method 200 or any other method described herein, and in combination with other functions and/or actions, including those described herein and those not set forth herein. All such embodiments are contemplated as within the scope of the present disclosure.

At block 210, a request for a type change may be received from an operator of an engine. This request may be encrypted. This request may include a serial number for an engine control unit and a desired type or an identifier of a desired type, as well as any information that may be of use. As noted, this request may be received in any manner, including electronically, verbally, via fax, etc. At block 220 a determination may be made as to whether the request is approved. For example, the serial number provided in the request may be compared to a stored serial number and crosschecked against identifying information for the operator of an engine. The request may also be decrypted to ensure authenticity at block 220. In some embodiments, the specific type change requested may need to be approved by, for example, engineers or technicians familiar with the associated engine, to ensure technical and mechanical soundness of the requested change and/or to ensure that the operator has paid for the requested type. If for any reason the request is not approved, at block 225 the requesting operator may be notified and the no type change code may be generated.

If the request is approved, at block 230 a type change code may be generated. This code may include a serial number of the affected engine control unit and an identifier of the desired type. The code may also include any instructions, encryption data, etc. that assist or instruct the engine control unit to implement the requested type change. This type change code may then be send to the operator at block 240 using any means.

Figure 3:
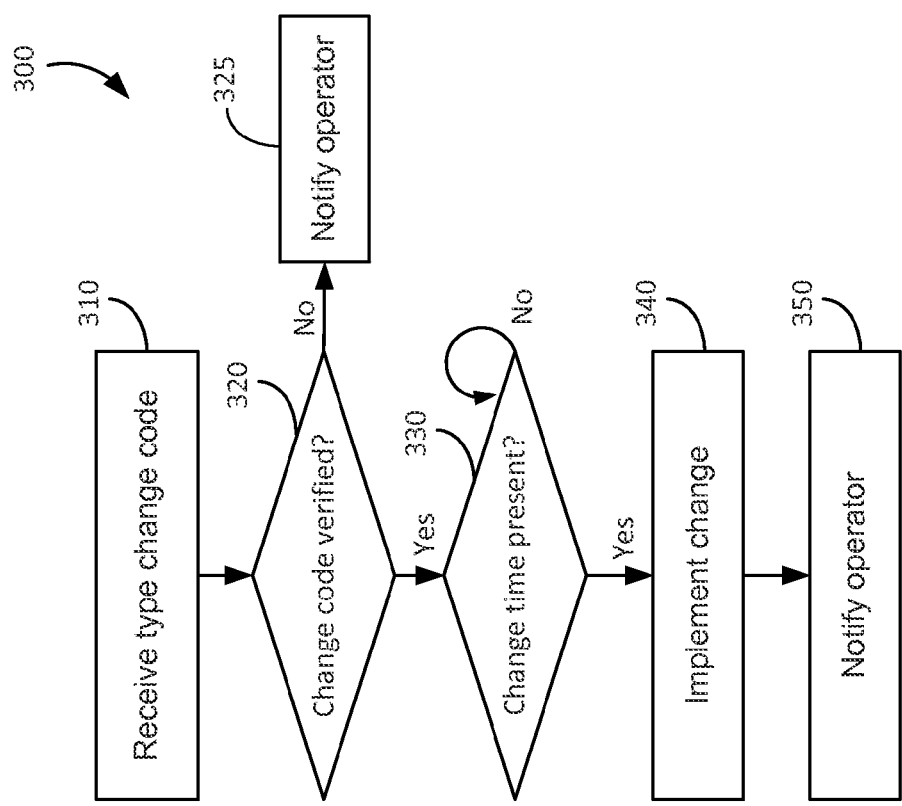
FIG. 3 is a flowchart illustrating a method of implementing a non-limiting exemplary engine control unit configuration security system.

FIG. 3 illustrates exemplary, non-limiting method 300 of implementing an embodiment as disclosed herein. Method 300, and the individual actions and functions described in method 300, may be performed by any one or more devices or components, including those described herein, such as engine control unit 120 of FIG. 1, and/or any other component or device of the systems illustrated in FIG. 1. In an embodiment, method 300 may be performed by any other devices, components, or combinations thereof, in some embodiments in conjunction with other systems, devices and/or components. Note that any of the functions and/or actions described in regard to any of the blocks of method 300 may be performed in any order, in isolation, with a subset of other functions and/or actions described in regard to any of the other blocks of method 300 or any other method described herein, and in combination with other functions and/or actions, including those described herein and those not set forth herein. All such embodiments are contemplated as within the scope of the present disclosure.

At block 310, a type change code, such as that generated by method 200 of FIG. 2, may be received at an engine control unit. This type change code may include a time or window of time to perform the type change, a serial number, and an identifier of the new type, as well as any other data or instructions that will cause an engine control unit to implement a type change. At block 320, the received type change code may be verified. This may include decrypting the code if necessary. Other verification may include determining that the serial number provided in the type change code corresponds to that of the receiving engine control unit. If for any reason the type change code cannot be verified, at block 325 the operator may be notified and no type change may be implemented.

If a time for the type change is specified by the type change code or by the operator, at block 330, the engine control unit may determine whether the time to perform the change has arrived. This may be in response to receiving a manual instruction from the operator to effect the type change at a particular time, or in response to determining that the type change code includes a specified time for the type change and previously determining that the time for the type change has not yet arrived. If the time for the type change hasn't arrived, the engine control unit may continue to monitor the time and compare the time to the provided time or window of time to perform the type change, remaining at block 330. If the time to perform the type change has arrived, or the current time is now within a window of time during which the implementation of the type change is permitted, at block 340 the type change may be implemented. At block 350, the operator may be notified of the change implementation.

After the type change is made, any changes to configurations of the engine control unit maybe compared to the new type to ensure that they are compatible with the new type. The options for configuration changes at an engine control unit presented to an operator may also be adjusted such that only those changes that are associated with the currently configured type on the engine control unit are presented and available to operator for selection.

Figure 4:
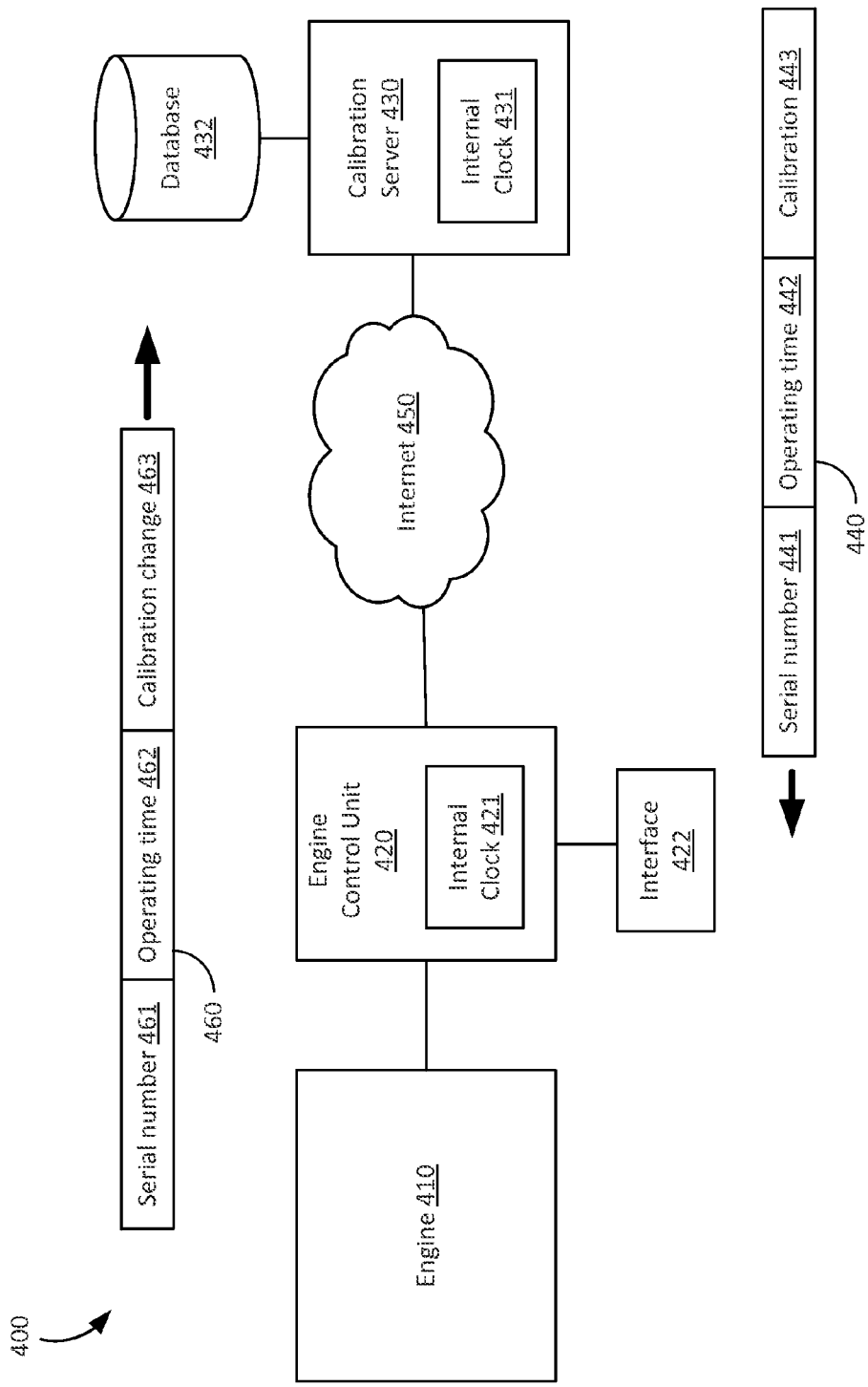
FIG. 4 is a block diagram of a non-limiting exemplary engine control unit configuration security system.

Calibration changes and other changes beyond type changes may also be controlled using embodiments set forth herein. FIG. 4 illustrates exemplary system 400 that may be implemented according to an embodiment for changing calibrations and other settings at an engine or engine control unit. As with system 100 of FIG. 1, system 400 as illustrated is a simplified block diagram that will be used to explain concepts disclosed herein, and therefore is not to be construed as setting forth any physical requirements or particular configuration required for any embodiment disclosed herein. All components, devices, systems, and methods described herein may be implemented with number of components of any shape, form, or type, and any combination of any such components that are capable of implementing the disclosed embodiments are contemplated as within the scope of the present disclosure.

Engine 410 may be any type of engine, including any type of internal combustion engine, such as a gas turbine engine, a diesel engine, and a gasoline engine. Engine control unit 420 maybe any type of computing device or controller, and may control engine 410 and any components of engine 410, and may control and/or set parameters that affect the operation of engine 410. Modern engines may have many different parameters and calibrations that may be adjusted or set. Among these are maximum horsepower allowed, maximum torque allowed, maximum revolutions per minute (RPMs) allowed, maximum overload, timing maps, governor adjustments, maximum boost allowed for turbocharged engines, limits for engine, engine component, and engine fluid temperatures, detonation limits, number of cylinders to use under specified conditions, etc. All such parameters and calibrations, and any others that may be configured for an engine, are contemplated as within the scope of the present disclosure. All such parameters and calibrations may be initially set at the time of manufacture or before an engine using such an engine control unit is provided to a customer to ensure that they are correct. The engine control unit may be configured so that it is not possible for the customer to alter such parameters and calibrations without assistance from the seller or manufacturer of the engine and/or the engine control unit.

Engine control unit 420 may include an internal clock 421 that maintains a current time and/or may be used to track operating time (i.e., the amount of time the engine has been in operation). Engine control unit 420 may also be configured with a serial number. Engine control unit may also be configured with interface 422 that allows interaction with engine control unit 420. Interface 422 may include any one or more of a keyboard, monitor, mouse, disk drive, network connection to any one or more networks (including the Internet, another data network, and a voice network), etc.

Upon determining that a calibration change is needed, an operator of engine 410 may send request 460 requesting a calibration change code to adjust the calibrations configured at engine control unit 420. Request 460 may take any form, including a telephone call where the operator requests a calibration change code from the seller or manufacturer of engine 410. In response, the seller or manufacturer may generate and provide such a code as described herein. Alternatively, the operator of engine 410 may use an automated interface, such as a web page, to generate request 460 and, in some embodiments, receive an automatically generated calibration change code generated as described herein. In yet other embodiments, the operator may email or send some other form of electronic request 460 for such a code to the manufacturer or seller of engine 410 via Internet 450 and receive a response in the same manner including the requested calibration change code that may be generated manually or automatically. All such embodiments are contemplated as within the scope of the present disclosure.

In an embodiment, request 460 from the operator may include specific calibration and/or parameter change 463 desired, as well as serial number 461 of engine control unit 120 and operating time 162 of engine control unit 120. Alternatively, request 460 may include specific calibration and/or parameter change 463 desired, serial number 461 of engine control unit 420, and the time when the change of calibration is desired relative to a reference time, such as the start time of operation of engine 410, a future time of operation relative to current operating time of engine 410, etc. An engine type may also be included and used as described above in regard to FIGS. 1-3. This request may then be provided to the manufacturer or sell of engine 410. Note that the request may also be encrypted so that only the intended recipient may decrypt the request.

Note that in some embodiments, rather than the serial number of engine control unit 420, the request may include one or more identifiers that may be used by the manufacturer or seller of engine 410 to determine a serial number for engine control unit 420. Such identifiers may include an engine type identifier that may be embedded into software, firmware, and/or hardware used in engine control unit 420 and that may identify the particular type of engine 410. Another alternative identifier may be an identifier of one or more circuit boards, motherboards, or any other type of hardware configured in engine control unit 420, or an identifier identifying a combination of any of such hardware. Yet another alternative identifier may be an identifier that represents a number of requested calibration changes thus far, in some embodiments representing only successfully performed calibration changes while in other embodiments representing a number of requests for calibrations changes regardless of whether such requests correspond to calibration changes that were successfully implemented.

Upon receipt of the request, the manufacturer or seller of engine 410 may verify the request, decrypt request 460 if necessary, and generate calibration change code 440. In some embodiments, the requested changed may be compared to an engine type of engine 410 that may have been indicated in the request or determined from another source as described above to ensure that the change is compatible with the engine type. In an embodiment, calibration server 430 may be used to generate such a code. Calibration server 430 may be any type of computing device or any combination of any number and types of computing devices. Calibration server 430 may be configured with internal clock 431 that may be used to coordinate and/or synchronize times included in requests such as request 460 so that calibration change code 440 will be accepted by an engine control unit. Calibration server 430 may also be configured with or otherwise have access to database 432 that may be a database configured with serial numbers, operation start time (to be used to determine current operating times), and any other data associated with engines and engine control units. Such data may be used to verify that request 460 is valid and from a legitimate source.

Generated calibration change code 440 may include serial number 441 of engine control unit 420, operating time 442 that may be the operating time at which changes to engine control unit 420's calibrations may be made, and calibration 443, which may be one or more changes to calibrations or parameters of engine control unit 420 as requested by the operator of engine 410. Note that operating time 442 may be a single time in the future at which changes are made or a window of time during which changes are may. For example, when operating time 442 is a single time, the changes provided in calibration 443 may be made at that time automatically by engine control unit 420. Alternatively, when operating time 442 is a window of time, the changes provided in calibration 443 may be made during that window of time only. Calibration change code 440 may be encrypted and may be provided in any manner, including electronically via internet 450, verbally, on a disk of any type, or using any other means, all of which are contemplated as within the scope of the present disclosure. An engine type may also be included in the calibration code and used as described above in regard to FIGS. 1-3.

Upon receipt of calibration change code 440, the operator of engine 410 may provide calibration change code 440 to engine control unit 420, in an embodiment using interface 422. Engine control unit 420 may be configured with software that (after decryption if necessary) checks calibration change code 440 to ensure that serial number 441 matches the serial number configured on engine control unit 420. This software may then determine that operating time 442 is the present, is in the past, or has yet to arrive. If operating time 442 is in the past, engine control unit 420 may reject calibration change code 440 or otherwise not implement the changes provided in calibration 443. If operating time 442 is the current time or a window of time that include the current time, engine control unit 420 may implement the changes provided in calibration change code 440. If operating time 442 is a future time or a window of time in the future, engine control unit 420 may wait to implement the changes provided in calibration change code 440 until the future time or window of time arrives.

Alternatively, the operator of engine 410 may manually instruct engine control unit 420, using interface 422, to implement the changes provided in calibration change code 440. Upon receiving such an instruction, engine control unit 420 may verify that the instruction is received within a window of time or the time provided by operating time 442, and if so, implement the changes. If such an instruction is received outside the time provided by operating time 442, engine control unit 420 may not implement the changes, and may provide an error message to the operator indicating that the changes could not be implemented.

Figure 5:
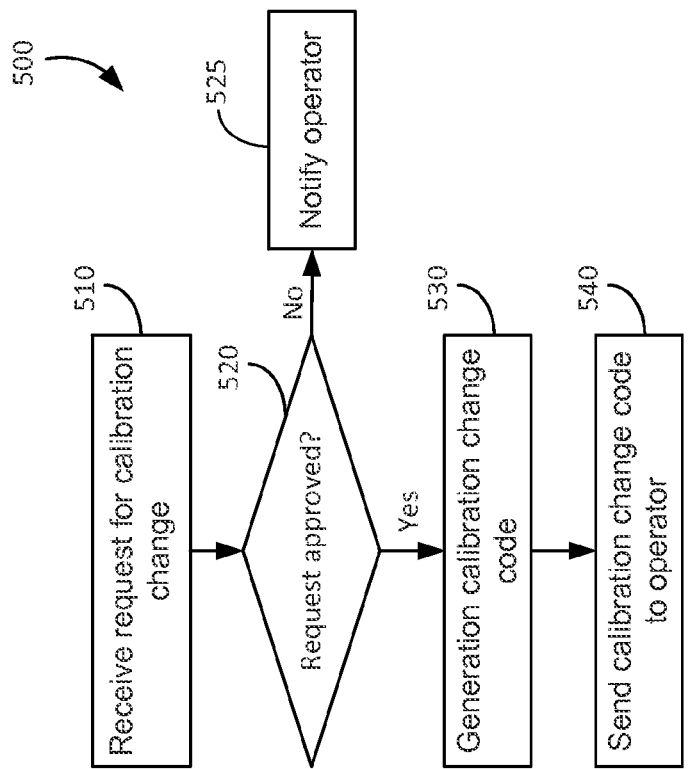
FIG. 5 is a flowchart illustrating a method of implementing a non-limiting exemplary engine control unit configuration security system.

FIG. 5 illustrates exemplary, non-limiting method 500 of implementing an embodiment as disclosed herein. Method 500, and the individual actions and functions described in method 500, may be performed by any one or more devices or components, including those described herein, such as code generation server 130 of FIG. 1, calibration server 430 of FIG. 4, and/or any other component or device of the systems illustrated in FIGS. 1 and 4. In an embodiment, method 500 may be performed by any other devices, components, or combinations thereof, in some embodiments in conjunction with other systems, devices and/or components. Note that any of the functions and/or actions described in regard to any of the blocks of method 500 may be performed in any order, in isolation, with a subset of other functions and/or actions described in regard to any of the other blocks of method 500 or any other method described herein, and in combination with other functions and/or actions, including those described herein and those not set forth herein. All such embodiments are contemplated as within the scope of the present disclosure.

At block 510, a request for a calibration change may be received from an operator of an engine. This request may be encrypted. This request may include a serial number for an engine control unit, a time or window of during which the change is to occur, any desired change(s), an engine type, and any other information that may be of use. As noted, this request may be received in any manner, including electronically, verbally, via fax, etc. At block 520 a determination may be made as to whether the request is approved. For example, the serial number provided in the request may be compared to a stored serial number and cross checked against identifying information for the operator of an engine. Alternatively, the engine type of the engine associated with the engine control unit to be changed may be checked to confirm that the requested change is compatible with the engine type. The request may also be decrypted to ensure authenticity at block 520. In some embodiments, the specific change(s) requested may need to be approved by, for example, engineers or technicians familiar with the associated engine, to ensure technical and mechanical soundness of the requested change. If for any reason the request is not approved, at block 525 the requesting operator may be notified and the no calibration change code may be generated.

If the request is approved, at block 530 a calibration change code may be generated. This code may include a serial number of the affected engine control unit, a time or window of during which the change is to occur, and specific codes, instructions, an engine type, etc. that instruct the engine control unit to implement the requested change(s). This calibration change code may then be send to the operator at block 540.

Figure 6:
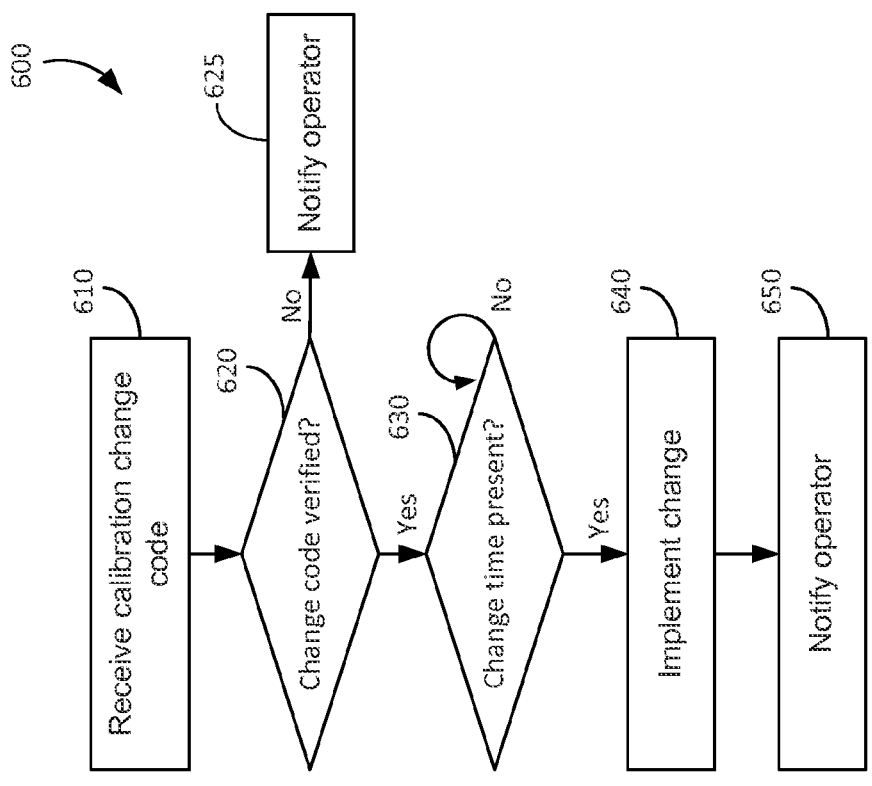
FIG. 6 is a flowchart illustrating a method of implementing a non-limiting exemplary engine control unit configuration security system.

FIG. 6 illustrates exemplary, non-limiting method 600 of implementing an embodiment as disclosed herein. Method 600, and the individual actions and functions described in method 600, may be performed by any one or more devices or components, including those described herein, such as engine control unit 120 of FIG. 1, engine control unit 420 of FIG. 4, and/or any other component or device of the systems illustrated in FIGS. 1 and 4. In an embodiment, method 600 may be performed by any other devices, components, or combinations thereof, in some embodiments in conjunction with other systems, devices and/or components. Note that any of the functions and/or actions described in regard to any of the blocks of method 600 may be performed in any order, in isolation, with a subset of other functions and/or actions described in regard to any of the other blocks of method 600 or any other method described herein, and in combination with other functions and/or actions, including those described herein and those not set forth herein. All such embodiments are contemplated as within the scope of the present disclosure.

At block 610, a calibration change code, such as that generated by method 500 of FIG. 5, may be received at an engine control unit. This calibration change code may include a time or window of time to perform a change, a serial number, an engine type, and one or more codes or instructions that will cause an engine control unit to implement changes to calibrations and/or parameters. At block 620, the received calibration change code may be verified. This may include decrypting the code if necessary. Other verification may include determining that the serial number provided in the calibration change code corresponds to that of the receiving engine control unit and that a time or window of time for the change is not in the past. If for any reason the calibration change code cannot be verified, at block 625 the operator may be notified and no changes may be implemented.

At block 630, the engine control unit may determine whether the time to perform the change has arrived. This may be in response to receiving a manual instruction from the operator to effect the changes listed, or in response to receiving the change code and previously determining that the time for the change has not yet arrived. If the time for the change hasn't arrived, the engine control unit may continue to monitor the time and compare the time to the provided time or window of time to perform the change, remaining at block 630. If the time to perform the change has arrived, or the current time is now within a window of time during which the implementation of the change is permitted, at block 640 the change may be implemented. At block 650, the operator may be notified of the change implementation.

The technical effect of the systems and methods set forth herein is the ability to control changes to the engine type configured on an engine control unit to ensure that only changes compatible with an allowed engine type are made. A further technical effect of the systems and methods set forth herein is the ability to control changes to engines and engine control units to ensure efficiency and performance. The systems and methods set forth herein may make it easier for operators of such engines to request and implement engine type and engine control unit changes. As will be appreciated by those skilled in the art, the use of the disclosed processes and systems may increase an operator's flexibility while maintaining an engine's reliability and efficient operation. Those skilled in the art will recognize that the disclosed systems and methods may be combined with other systems and technologies in order to achieve even greater benefits. All such embodiments are contemplated as within the scope of the present disclosure.

Note that in some embodiments, changes may be more extensive than may be easily made using a type change code or calibration code as described herein, and in such embodiments, the type change code or calibration code may also, or instead, allow an engine control unit to download or otherwise receive change instructions and/or updated software, firmware, etc. (for a type change, a calibration change, or otherwise) via a network connection. Any codes, typings, calibrations, and other adjustments may be made available to an engine control unit by enabling the engine control unit to communicate with a remote device using a type change code as described herein. All such embodiments are contemplated as within the scope of the present disclosure.

Figure 7:
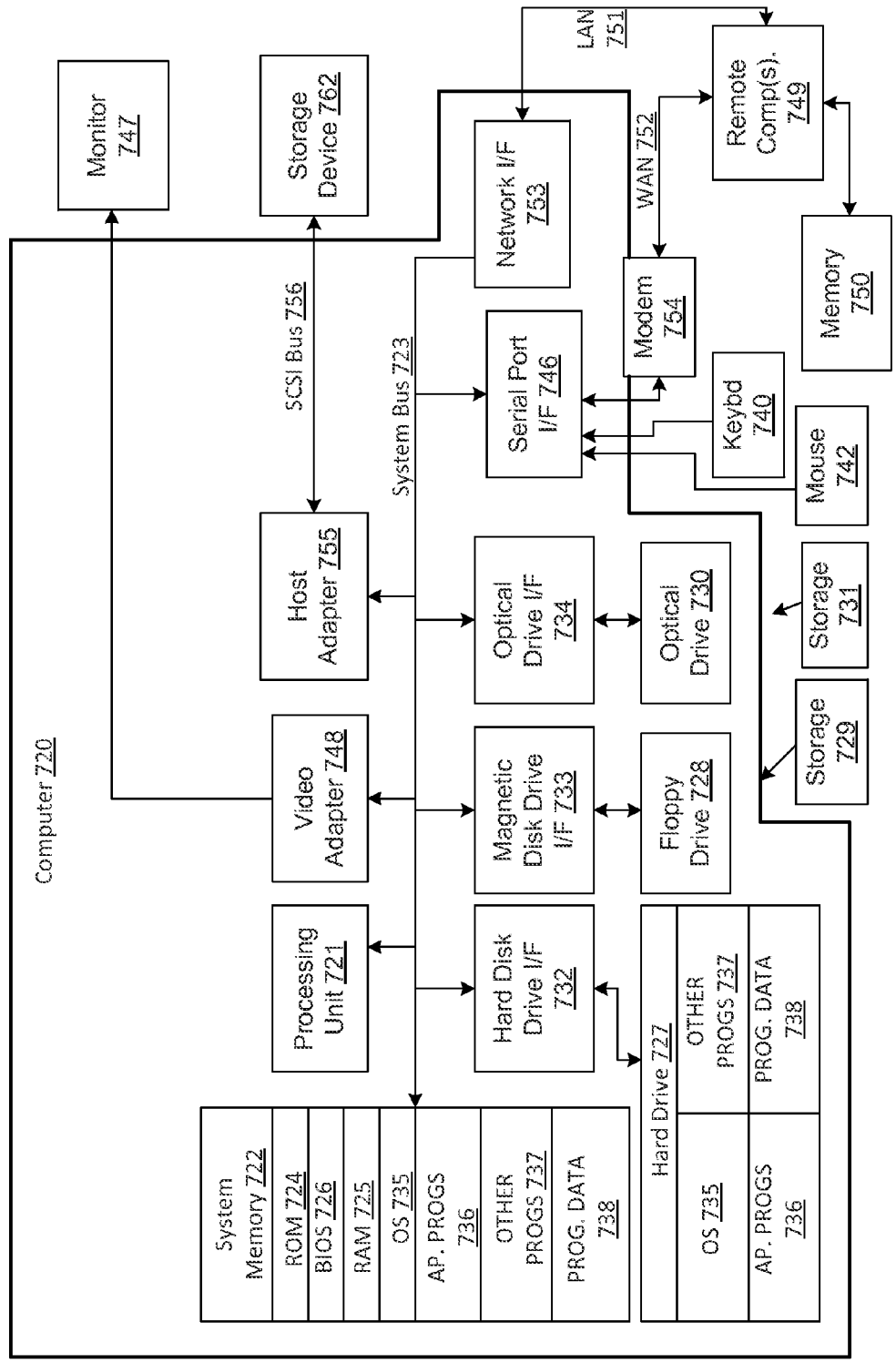
FIG. 7 is an exemplary block diagram representing a general purpose computer system in which aspects of the methods and systems disclosed herein may be incorporated.

FIG. 7 and the following discussion are intended to provide a brief general description of a suitable computing environment in which the engine control unit configuration security systems and methods disclosed herein and/or portions thereof may be implemented. For example, the functions of engine control units 120 and 420, code generation server 130, and calibration server 430 may be performed by one or more devices that include some or all of the aspects described in regard to FIG. 7. Some or all of the devices described in FIG. 7 that may be used to perform functions of the claimed embodiments may be configured in a controller that may be embedded into a system such as those described with regard to FIGS. 1 and 4. Alternatively, some or all of the devices described in FIG. 7 may be included in any device, combination of devices, or any system that performs any aspect of a disclosed embodiment.

Although not required, the engine control unit configuration security systems and methods disclosed herein may be described in the general context of computer-executable instructions, such as program modules, being executed by a computer, such as a client workstation, server or personal computer. Such computer-executable instructions may be stored on any type of computer-readable storage device that is not a transient signal per se. Generally, program modules include routines, programs, objects, components, data structures and the like that perform particular tasks or implement particular abstract data types. Moreover, it should be appreciated that the engine control unit configuration security systems and methods disclosed herein and/or portions thereof may be practiced with other computer system configurations, including hand-held devices, multi-processor systems, microprocessor-based or programmable consumer electronics, network PCs, minicomputers, mainframe computers and the like. The methods and systems disclosed herein may also be practiced in distributed computing environments where tasks are performed by remote processing devices that are linked through a communications network. In a distributed computing environment, program modules may be located in both local and remote memory storage devices.

FIG. 7 is a block diagram representing a general purpose computer system in which aspects of the methods and systems disclosed herein and/or portions thereof may be incorporated. As shown, the exemplary general purpose computing system includes computer 720 or the like, including processing unit 721, system memory 722, and system bus 723 that couples various system components including the system memory to processing unit 721. System bus 723 may be any of several types of bus structures including a memory bus or memory controller, a peripheral bus, and a local bus using any of a variety of bus architectures. The system memory may include read-only memory (ROM) 724 and random access memory (RAM) 725. Basic input/output system 726 (BIOS), which may contain the basic routines that help to transfer information between elements within computer 720, such as during start-up, may be stored in ROM 724.

Computer 720 may further include hard disk drive 727 for reading from and writing to a hard disk (not shown), magnetic disk drive 728 for reading from or writing to removable magnetic disk 729, and/or optical disk drive 730 for reading from or writing to removable optical disk 731 such as a CD-ROM or other optical media. Hard disk drive 727, magnetic disk drive 728, and optical disk drive 730 may be connected to system bus 723 by hard disk drive interface 732, magnetic disk drive interface 733, and optical drive interface 734, respectively. The drives and their associated computer-readable media provide non-volatile storage of computer-readable instructions, data structures, program modules and other data for computer 720.

Although the exemplary environment described herein employs a hard disk, removable magnetic disk 729, and removable optical disk 731, it should be appreciated that other types of computer-readable media that can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on hard disk drive 727, magnetic disk 729, optical disk 731, ROM 724, and/or RAM 725, including an operating system 735, one or more application programs 736, other program modules 737 and program data 738. A user may enter commands and information into the computer 720 through input devices such as a keyboard 740 and pointing device 742. Other input devices (not shown) may include a microphone, joystick, game pad, satellite disk, scanner, or the like. These and other input devices are often connected to the processing unit 721 through a serial port interface 746 that is coupled to the system bus, but may be connected by other interfaces, such as a parallel port, game port, or universal serial bus (USB). A monitor 747 or other type of display device may also be connected to the system bus 723 via an interface, such as a video adapter 748. In addition to the monitor 747, a computer may include other peripheral output devices (not shown), such as speakers and printers. The exemplary system of FIG. 7 may also include host adapter 755, Small Computer System Interface (SCSI) bus 756, and external storage device 762 that may be connected to the SCSI bus 756.

The computer 720 may operate in a networked environment using logical and/or physical connections to one or more remote computers or devices, such as remote computer 749, components of engine 110, and engine control unit 120. Components of engine 110 and engine control unit 120 may be any device as described herein capable of performing the described functions. Remote computer 749 may be a personal computer, a server, a router, a network PC, a peer device or other common network node, and may include many or all of the elements described above relative to the computer 720, although only a memory storage device 750 has been illustrated in FIG. 7. The logical connections depicted in FIG. 7 may include local area network (LAN) 751 and wide area network (WAN) 752. Such networking environments are commonplace in offices, enterprise-wide computer networks, intranets, and the Internet.

When used in a LAN networking environment, computer 720 may be connected to LAN 751 through network interface or adapter 753. When used in a WAN networking environment, computer 720 may include modem 754 or other means for establishing communications over wide area network 752, such as the Internet. Modem 754, which may be internal or external, may be connected to system bus 723 via serial port interface 746. In a networked environment, program modules depicted relative to computer 720, or portions thereof, may be stored in a remote memory storage device. It will be appreciated that the network connections shown are exemplary and other means of establishing a communications link between computers may be used.

Computer 720 may include a variety of computer-readable storage media. Computer-readable storage media can be any available tangible, non-transitory, or non-propagating media that can be accessed by computer 720 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by computer 720. Combinations of any of the above should also be included within the scope of computer-readable media that may be used to store source code for implementing the methods and systems described herein. Any combination of the features or elements disclosed herein may be used in one or more embodiments.

This written description uses examples to disclose the subject matter contained herein, including the best mode, and also to enable any person skilled in the art to practice the invention, including making and using any devices or systems and performing any incorporated methods. The patentable scope of this disclosure is defined by the claims, and may include other examples that occur to those skilled in the art.

Such other examples are intended to be within the scope of the claims if they have structural elements that do not differ from the literal language of the claims, or if they include equivalent structural elements with insubstantial differences from the literal languages of the claims.

What is claimed is:

1. A system for protecting a configuration of engine control units, the system comprising:
    a memory comprising instructions; and
    a processor coupled to the memory, wherein the processor, when executing the instructions, effectuates operations comprising:
    receiving a serial number associated with an engine control unit and a requested engine control unit change;
    determining that the requested engine control unit change is approved; and
    generating a code comprising the serial number associated with the engine control unit and an instruction that causes the engine control unit to either: implement the requested engine control unit change or reject the code or otherwise not implement the requested engine control unit change.

2. The system of claim 1, wherein the requested engine control unit change is one of a change of a calibration configured at the engine control unit and a change of an engine type configured at the engine control unit.

3. The system of claim 1, wherein the operations further comprise receiving a change time.

4. The system of claim 1, wherein the serial number associated with the engine control unit and the requested engine control unit change are received in an encrypted electronic message.

5. The system of claim 1, wherein the operations further comprise transmitting the code to the engine control unit in an encrypted electronic message.

6. The system of claim 1, wherein determining that the requested engine control unit change is approved comprises determining that an engine associated with the engine control unit is compatible with the requested engine control unit change.

7. The system of claim 1, wherein determining that the requested engine control unit change is approved comprises determining that an operator of an engine associated with the engine control unit has paid for the requested engine control unit change.

8. A method for protecting a configuration of engine control units, the method comprising:
    receiving, at a change control device, a serial number associated with an engine control unit and a requested engine control unit change;
    determining, at the change control device, that the requested engine control unit change is approved; and
    generating, at the change control device, a code comprising the serial number associated with the engine control unit and an instruction that causes the engine control unit to either: implement the requested engine control unit change or reject the code or otherwise not implement the requested engine control unit change.

9. The method of claim 8, wherein the requested engine control unit change is one of a change of a calibration configured at the engine control unit and a change of an engine type configured at the engine control unit.

10. The method of claim 8, further comprising receiving a change time.

11. The method of claim 8, wherein the serial number associated with the engine control unit and the requested engine control unit change are received in an encrypted electronic message.

12. The method of claim 8, further comprising transmitting the code to the engine control unit in an encrypted electronic message.

13. The method of claim 8, wherein determining that the requested engine control unit change is approved comprises determining that an engine associated with the engine control unit is compatible with the requested engine control unit change.

14. The method of claim 8, wherein determining that the requested engine control unit change is approved comprises determining that an operator of an engine associated with the engine control unit has paid for the requested engine control unit change.

15. A non-transitory computer-readable medium comprising computer-executable instructions, which when executed by a processor, cause the processor to effectuate operations for protecting a configuration of engine control units, the medium comprising:
    receiving a serial number associated with an engine control unit and a requested engine control unit change;
    determining that the requested engine control unit change is approved; and
    generating a code comprising the serial number associated with the engine control unit and an instruction that causes the engine control unit to either: implement the requested engine control unit change or reject the code or otherwise not implement the requested engine control unit change.

16. The non-transitory computer-readable medium of claim 15, wherein the requested engine control unit change is one of a change of a calibration configured at the engine control unit and a change of an engine type configured at the engine control unit.

17. The non-transitory computer-readable medium of claim 15, wherein the operations further comprise receiving a change time.

18. The non-transitory computer-readable medium of claim 15, wherein the serial number associated with the engine control unit and the requested engine control unit change are received in an encrypted electronic message.

19. The non-transitory computer-readable medium of claim 15, wherein the operations further comprise transmitting the code to the engine control unit in an encrypted electronic message.

20. The non-transitory computer-readable medium of claim 15, wherein determining that the requested engine control unit change is approved comprises determining that an engine associated with the engine control unit is compatible with the requested engine control unit change.

* * * * *